(12) United States Patent
Natarajan et al.

(10) Patent No.: US 10,382,319 B2
(45) Date of Patent: Aug. 13, 2019

(54) MULTIPLE VXLAN TUNNEL REACHABILITY

(71) Applicant: Dell Products LP, Round Rock, TX (US)

(72) Inventors: Avinash Natarajan, Chennai (IN); Damodharan Screenivasaga Perumal, Aruppukottai (IN); Ramasubramani Mahadevan, Chennai (IN); Nirupa Venkatapathy, Chennai (IN); Venkata Gouri Rajesh E, Vijayanagaram (IN)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 15/797,312

(22) Filed: Oct. 30, 2017

(65) Prior Publication Data
US 2019/0132240 A1 May 2, 2019

(51) Int. Cl.
*H04L 12/861* (2013.01)
*H04L 12/709* (2013.01)
*H04L 12/46* (2006.01)

(52) U.S. Cl.
CPC ........ *H04L 45/245* (2013.01); *H04L 12/4633* (2013.01); *H04L 12/4641* (2013.01)

(58) Field of Classification Search
CPC ............... H04L 45/245; H04L 12/4641; H04L 12/4633
See application file for complete search history.

(56) References Cited

U.S. PATENT DOCUMENTS

| 10,142,129 | B1* | 11/2018 | Gupta | H04L 12/4641 |
| 2014/0219081 | A1* | 8/2014 | Natarajan | H04L 41/0659 370/228 |
| 2015/0312088 | A1* | 10/2015 | Ramakrishnan | H04L 41/0654 370/218 |
| 2018/0019938 | A1* | 1/2018 | Muthukaruppan | H04L 45/02 |
| 2018/0324089 | A1* | 11/2018 | Subramanian | H04L 45/48 |

* cited by examiner

*Primary Examiner* — Jay P Patel
(74) *Attorney, Agent, or Firm* — Staniford Tomita LLP

(57) ABSTRACT

Embodiments are directed to facilitate multiple tunnels to be reachable via inter-chassis ling from virtual link trunking (VLT) peers and also to avoid traffic tromboning with an optimal path to all next hops. During initialization, a default egress object is created through an ICL with the next hop defined as VLT peer2 by setting the MAC address to be the MAC address of the VLT peer2, and the VLAN to be any one of the L3 spanned VLANs. When any of the VXLAN tunnels are resolved through ICL LAG, the process uses the default egress object created on ICL. Using the default egress object created on ICL, any traffic from VLT peer1 intended to go through ICL is terminated on VLT peer2 and will get routed again to their respective next hops. This creates a single egress object to the VLT peer and allowing multiple VXLAN tunnels to be reachable through ICL with optimal path towards all next hops.

17 Claims, 5 Drawing Sheets

MULTIPLE VXLAN TUNNEL REACHABILITY

TECHNICAL FIELD

Embodiments are generally directed to virtual extensible LAN (VXLAN) networks, and more specifically to increasing connections between routers in VXLAN networks.

BACKGROUND

VXLAN (virtual extensible LAN) is a virtualization technology was developed to address the scalability problems associated with large cloud computing systems. VXLAN provides mechanisms to aggregate and tunnel multiple layer 2 Ethernet sub-networks across a layer 3 infrastructure. For example, VXLAN may be used to connect two or more layer 2 network domains and make them look like a common layer 2 domain. This allows virtual machines on different networks to communicate as if they were in the same layer 2 subnet. Technically, VXLAN uses a VLAN-like encapsulation technique to encapsulate MAC-based OSI layer 2 Ethernet frames within layer 3 UDP packets. VXLAN endpoints, which terminate VXLAN tunnels and may be both virtual or physical switch ports, are known as VXLAN tunnel endpoints (VTEPs). Networking devices generally process VXLAN traffic transparently. That is, IP encapsulated traffic is switched or routed the same as any IP traffic. The VXLAN gateways (VTEPs) provide the encapsulating/de-encapsulating services central to VXLAN. VTEPS can be virtual bridges in the hypervisor, VXLAN aware VM applications or VXLAN capable switching hardware.

The VXLAN specification was developed by Arista, Broadcom, Intel, VMware, and others to improve scaling in virtualized data centers, among other applications. Routers and switches made by Broadcom are thus ubiquitous in VXLAN systems. In such networks, egress port to next hop mapping (EGR_PORT_TO_NHI_MAPPING) is one-to-one for every egress port, and hence only one next hop index can be mapped to an egress port. In a virtual link trunking (VLT) topology, when network port is a VLT lag (link aggregation), VLT peers will be in the same broadcast LAN and it is not possible to reach multiple remote VTEPs from a VLT peer through inter-chassis link (ICL), due to a particular restriction imposed or associated with Broadcom routers. This limitation causes certain bottleneck conditions that can greatly reduce network performance. In an embodiment, ICL is a link standard that provides a dedicated blade for switch ports for end devices in a network fabric by transporting traffic between chassis over dedicated high-speed links.

One such affect is traffic tromboning where traffic between a branch user and an Internet-based site may be backhauled over a corporate WAN, through a data center, then "tromboned" through to its Internet destination, then back to that data center, and finally is sent back over the corporate WAN to the original site. Such tromboning effects can add significant amounts of latency (e.g., plus 30 to 80 milliseconds of access latency for branch users) that can greatly effect network performance.

It is advantageous, therefore, to facilitate multiple tunnels to be reachable via ICL from VLT peers and also to avoid traffic tromboning with optimal path to all next hops.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
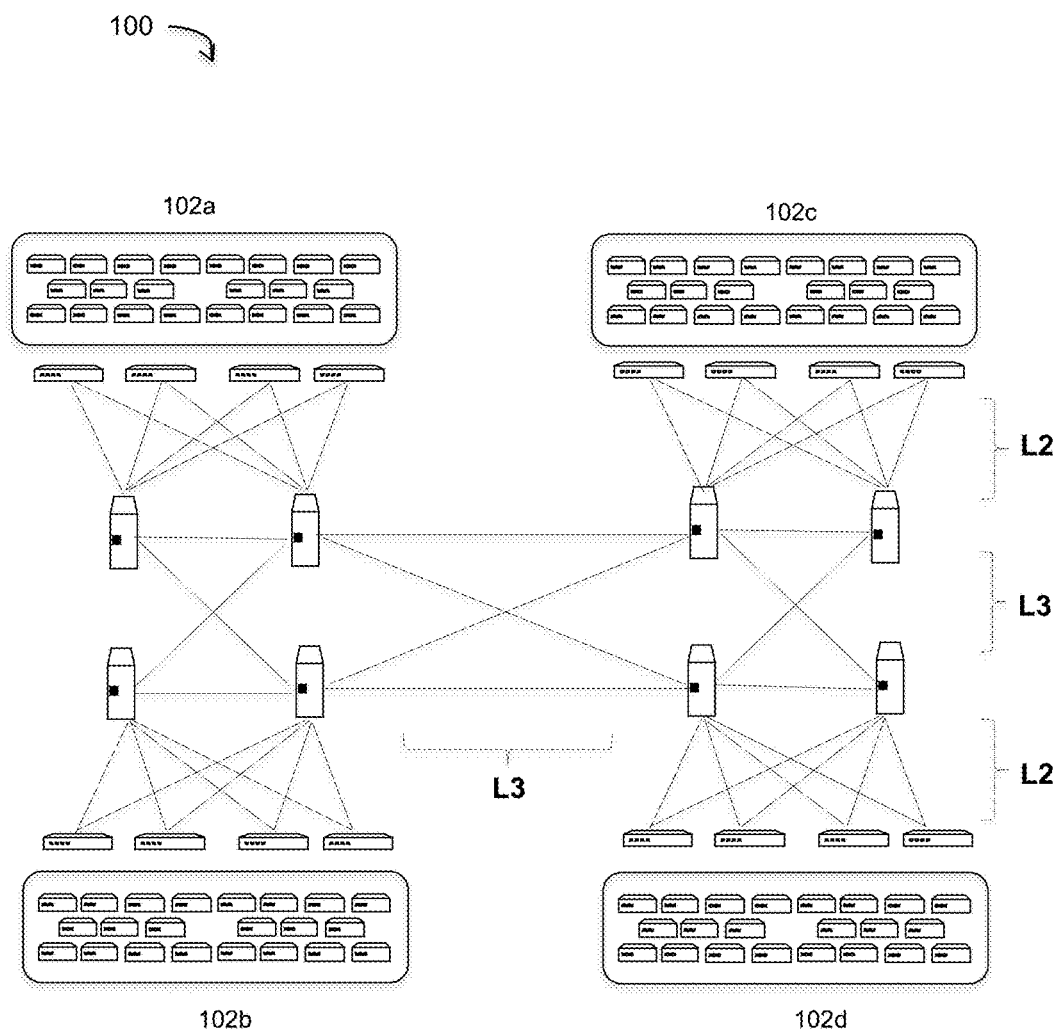
FIG. 1 is a diagram of a large-scale network implementing a multiple VXLAN tunneling merging process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Although embodiments are described in relation to a VXLAN-based network, certain described methods may involve automated techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a VXLAN network 100 that implements one or more embodiments of an inter-chassis link VXLAN tunnel connectivity, under some embodiments. In system 100, multiple host clusters 102a-d encompass small virtualized environments of VMs. In a multi-tenant cloud architecture, these clusters can be coupled through a combination of layer 2 (L2) and layer 3 (L3) devices and networks. In general, layer 2 is the data link where data packets are encoded and decoded into bits. The switches and links of the L2 networks forward all traffic, so that anything transmitted by one device is forwarded to all devices. The layer 3 networks provide switching and routing technologies, creating logical paths, known as virtual circuits, for transmitting data from node to node. Routing and forwarding are functions of this layer, as well as addressing, internetworking, error handling, congestion control and packet sequencing. The layer 3 protocols reduce overall traffic levels by allowing users to divide networks into smaller parts and restrict broadcasts to only that sub-network.

Each cluster 102 in FIG. 1 may be a Virtual Data Center based on a hypervisor, such as Hyper-V from VMware. System 100 also includes Top-of-Rack (TOR) switches that connects physical servers that host the VMs, that can each belong to at least one virtual LAN.

The clusters 102 thus contain a number of VMs or groups of VMs that are provisioned to perform certain tasks, such as to serve as backup targets in a data replication environment. In such an application, target VMs may be organized into one or more virtual centers representing a physical or virtual network of many virtual machines (VMs), such as on the order of thousands of VMs each. The VMs serve as target storage devices for data backed up from one or more data sources that utilize networked accessed storage devices. The data sourced by the data source may be any appropriate data, such as database data that is part of a database management system. In this case, the data may reside on one or more hard drives and may be stored in the database in a variety of formats, such as XML (Extensible Markup Language) databases.

A network server computer may be coupled directly or indirectly to the target VMs and to the data source through a central network, which may be a cloud network, LAN, WAN or other appropriate network. This network provides connectivity to the various systems, components, and resources of system 100, and may be implemented using protocols such as Transmission Control Protocol (TCP) and/or Internet Protocol (IP), well known in the relevant arts. In a distributed network environment, network may represent a cloud-based network environment in which applications, servers and data are maintained and provided through a centralized cloud-computing platform. In an embodiment, system 100 represents a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

In an embodiment, system 100 implements the VXLAN architecture to aggregate and tunnel multiple layer 2 networks or sub-networks across an infrastructure. The VXLAN base case is to connect two or more layer three network domains and make them look like a common layer 2 domain. This allows virtual machines on different networks (e.g., 102a and 102c) to communicate as if they were in the same layer 2 sub-network. In general, the networking devices of FIG. 1 process VXLAN traffic transparently, such that IP encapsulated traffic is switched or routed the same as any IP traffic. VXLAN gateways, also called Virtual Tunnel End Points (VTEP), provide the encapsulating/de-encapsulating services central to VXLAN. VTEPs can be implemented as virtual bridges in the hypervisor, VXLAN-aware VM applications or VXLAN capable switching hardware.

As stated above, in Broadcom router-based networks, egress port to next hop mapping is one-to-one for every egress port and hence only one next hop index can be mapped to an egress port. In a VLT topology, this means that when a network port is a link aggregated (VLT LAG), VLT peers and TOR switches will be in the same broadcast LAN and it is not possible to reach multiple remote VTEPs from a VLT peer through ICL, due to one-to-one mapping restriction. This same problem can also be seen with non-VLT ports also, such as when multiple remote VTEPs are reachable through ICL, but with different next hops.

Figure 2:
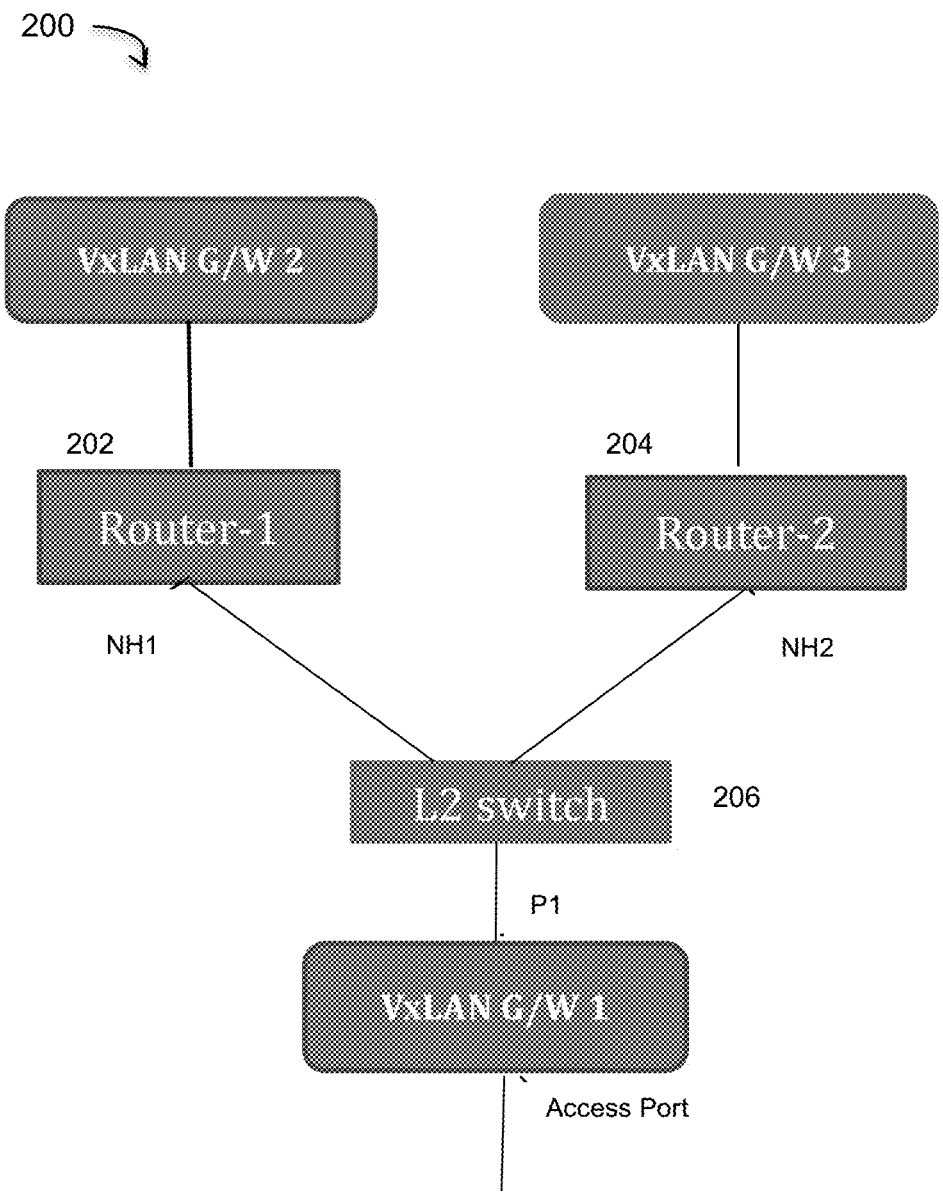
FIG. 2 illustrates a Broadcom-based network prior to implementation of a multiple tunneling process.

FIG. 2 illustrates a Broadcom router-based network prior to implementation of a multiple tunneling process. In diagram 200, VXLAN G/W2 (gateway 2) and G/W3 (gateway 3) are reachable from VXLAN G/W1 via a L2 switch 206 through two different next hops NH1 and NH2 using the same egress port P1 of G/W1. Since the routers 202 and 204 are in the same broadcast LAN, two different next hops should be reachable through the same port.

Certain Ethernet switches, such as the Broadcom T2, Tomahawk and TH+ model switches have a restriction with respect to supporting multiple next hops via the same outgoing port for VXLAN encapsulation. For system 200, either router-1 can be chosen as next hop or router-2 can be chosen as next hop, but not both at the same time via the single outgoing network port P1. If router-1 is chosen, then VXLAN encapsulated traffic originated at VXLAN G/W 1 for VXLAN G/W 3 will be tromboned at router-1 back to the L2 switch 206 and will be L2 forwarded to the intended next hop router-2. If a route to the destination IP does not exist in router-1, then the packet can get dropped as well.

Embodiments of a multiple tunneling process described herein facilitate multiple tunnels to be reachable via ICL from VLT peers and also to avoid traffic tromboning with an optimal path to all next hops. This is accomplished through a process that, during initialization (i.e., once the VLT peers are up and system MAC addresses are exchanged) creates a default egress object through an ICL with next hop defined as VLT peer2. This is done by setting the MAC address to be the MAC address of the VLT peer2, and the VLAN to be any one of the L3 spanned VLANs. When any of the VXLAN tunnels are resolved through ICL LAG, the process always use the default egress object created on ICL. Using the default egress object created on ICL, any traffic from VLT peer1 intended to go through ICL is terminated on VLT peer2 and will get routed again to their respective next hops. The process thus creates a single egress object to the VLT peer and allowing multiple VXLAN tunnels to be reachable through ICL with optimal path towards all next hops.

This solution greatly alleviates previous issues of traffic tromboning where packets will take the sub-optimal path, such as in a case where a VLT topology has two TOR switches and each one is a VTEP in the context of VXLAN. In this case, from VLT peer1, next-hop towards VTEP1 is programmed for ICL ports, and to reach VTEP2, traffic from VLT peer1 might take an indirect path (VLT peer1 to VLT peer2 to VTEP1 to VLT peer2 to VTEP2), whereas packet could have directly taken path towards VTEP2 from VLT peer 2, thus avoiding VTEP1.

The problem being overcome (e.g., the Broadcom restriction) involves supporting only one next hop via a network port in a broadcast LAN for reaching remote VTEPs. That is:

[DVP→Ingress L3 Next Hop→Port→Port Mapping table (Key=Port)→Egress L3 Next Hop (Has DA Mac, Port, L3 Interface)]

The Port Mapping table (having port as the key and pointing to egress L3 next hop) is the bottleneck in the VXLAN data path. In a VXLAN VLT, the native traffic sent over ICL is only locally switched and never VXLAN encapsulated. The reason for this is that there is no way to determine whether the traffic was received in the peer-side via network port or access-port. If it was received via the network port, then the traffic can be sent back to originating VTEP itself resulting in loop.

In an embodiment of the VXLAN multiple tunnel process, the issues presented by system 200 of FIG. 2 are overcome in that tromboning of VXLAN traffic is avoided by always choosing peer-VLT as the next hop for VXLAN data path, when ICL is an outgoing port due to half-VLT going down (while Route/ARP computation would have actually computed a different next hop). When the local exit is down, an ICL backup path is enabled using protection logic. There is no need to rewrite individual L2 MAC addresses. The process also avoids unnecessary forwarding of VXLAN encapsulating packet back to host in case of unknown L2 traffic handling at peer VLT device; and avoids black holing of traffic when the destination route is unknown at the intermediate next hop router.

Figure 3:
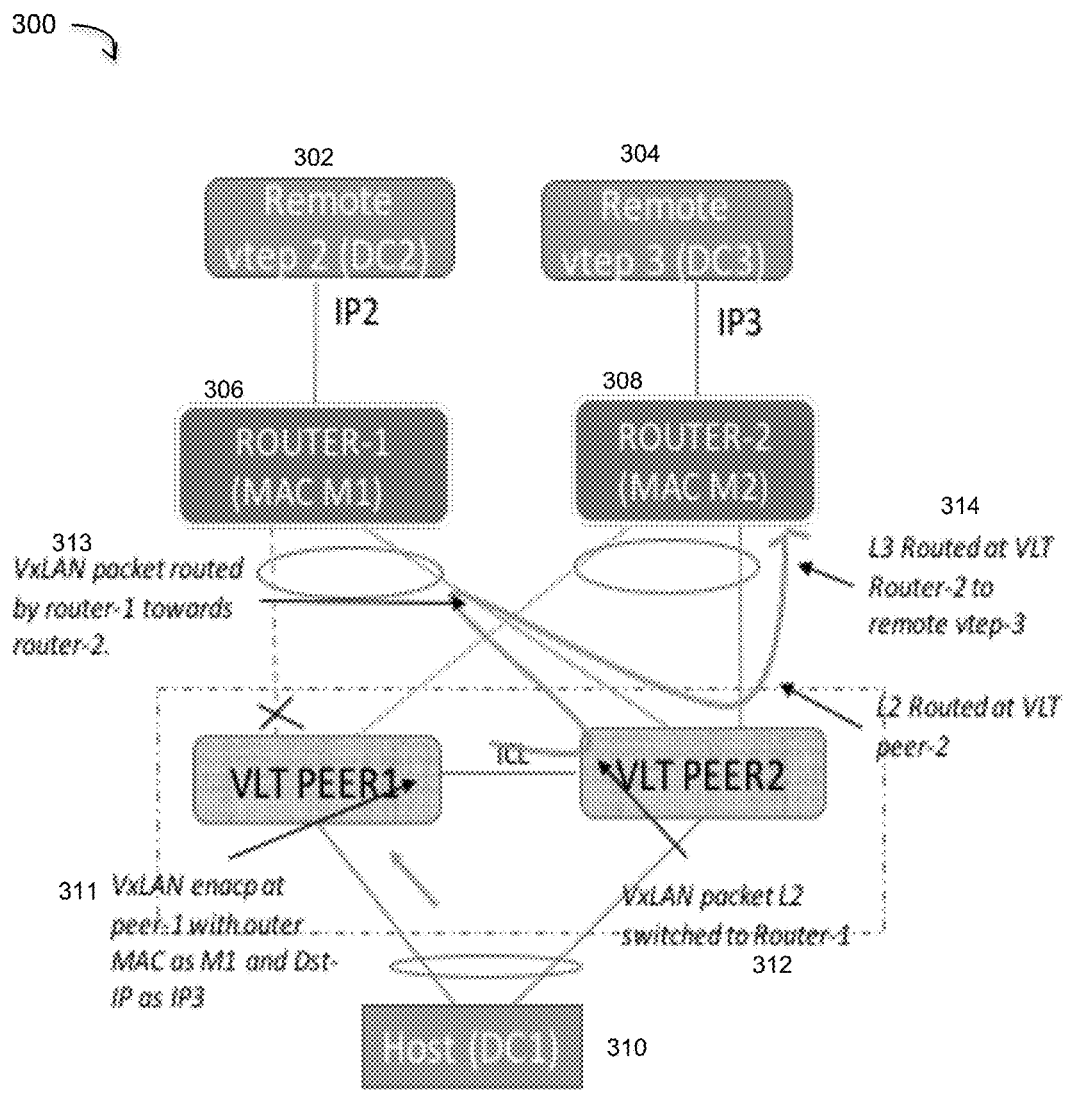
FIG. 3 is a diagram 300 that illustrates a VXLAN VLT multi-tunneling process, under some embodiments.

FIG. 3 is a diagram that illustrates a VXLAN VLT multi-tunneling process, under some embodiments. System 300 of FIG. 3 includes two remote VTEPs 302 and 304 (denoted respectively VTEP2 and VTEP3) routed through router-1 306 and router-2 308 to VLT peer-1 and peer-2 and to host (DC1). The host 310 sends native unicast/broadcast traffic towards VLT peer-1 on VLAN x. VLAN x is mapped to VNID 1000, for example. On one or more half-VLT uplinks' failure on peer-1 (e.g., a LACP timeout and ungrouping), no local exit available at VLT peer-1 for packets whose data path uplink to next hop router is down, and hence ICL is the only path to reach the end destination.

Router-1 and router-2 are next hop routers reachable via the same ICL port-channel. Due to BCM restriction only one of the next hop routers can be programmed in the hardware. To overcome this, peer-1 must pick a single next hop, in the VXLAN forwarding path related next hop entry, to be able to reach IP2 as well as IP3 (there could be more than two destinations if more uplinks are down). For packets meant for VTEP4, nothing changes, and the next hop info that the corresponding DVP (distance vector protocol) points to peer-1 continues to be the uplink port and MAC M3.

For packets meant for VTEP2 and VTEP3, once the uplink goes down, the next hop data pointed to by the corresponding DVPs is modified to contain the ICL port and the VLT peer MAC. Broadcom switches have a protection logic that makes this specific modification rapid, and leads to very minimal traffic loss upon half-VLT uplink failure. In an example embodiment, suppose peer-1 picks either router-1 or router-2 as the next hop (e.g., router-1). In this case: VLT peer-1 does the VXLAN encapsulation and sends it towards the next hop router; the outer header will have the destination MAC as M1 and the outer destination IP will have IP3. This is shown in FIG. 3 as flow point 311. The VXLAN encapsulation packet gets L2 switched at VLT peer-2 towards router-1, as shown in flow point 312. Router-1 then routes the VXLAN encapsulation packet by looking at the outer destination IP by rewriting the destination MAC of outer header as M2. The packet is tromboned and comes back to VLT peer-2. VLT peer-2 then switches the VXLAN encapsulation packet towards router-2, as shown in flow point 313. If, in case VLT peer-2 does not have the L2 MAC for router-2 at that instant, then the VXLAN encapsulation packet goes back to the originating host as well. Router-2 then forwards the packet towards Remote VTEP-3, as shown in flow point 314. There is a theoretical possibility of router-1 to not have a route for IP3 as well.

In an embodiment, the multi-tunneling process sets peer-2's MAC as the next hop MAC, for all next hops reachable via ICL post uplinks' failure. VLT peers typically have a L3 adjacency, so peer-2 would be able to route directly to router-2, and the packet would be on the way to the target VTEP. The possibility of packet looping back (momentary flooding), getting black-holed (e.g., router-1 not having a route entry) or getting tromboned (packets get delivered but in a circuitous path), are all avoided in this process.

Figure 4:
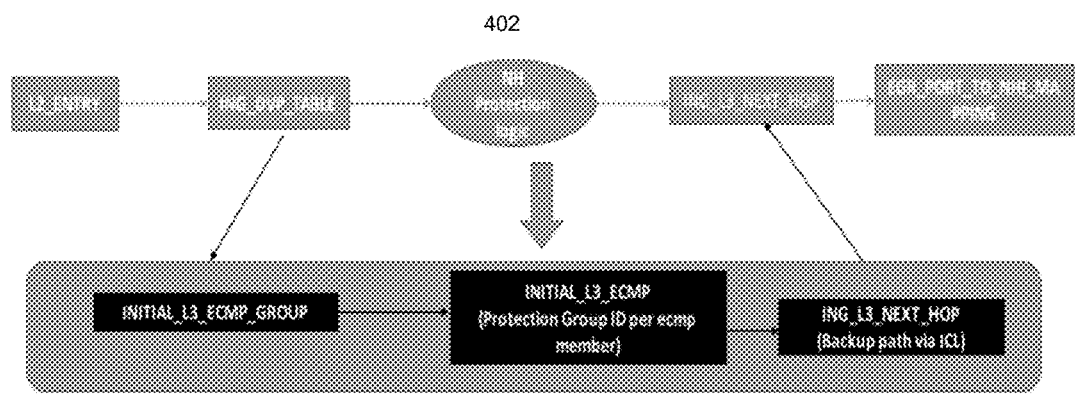
FIG. 4 illustrates configuring an egress object created on ICL as a protection next hop for VLT LAGS, under some embodiments.

FIG. 4 illustrates configuring an egress object created on ICL as a protection next hop for VLT LAGs, under some embodiments. As shown in FIG. 4, in case of VLT LAGs, the process configures the egress object created on ICL as a protection next hop for VLT LAGS. When there is a local failure in a VLT LAG, a next hop created on ICL can be triggered using protection switching logic 402.

As described above, embodiments are directed to VXLAN tunneling process that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 5:
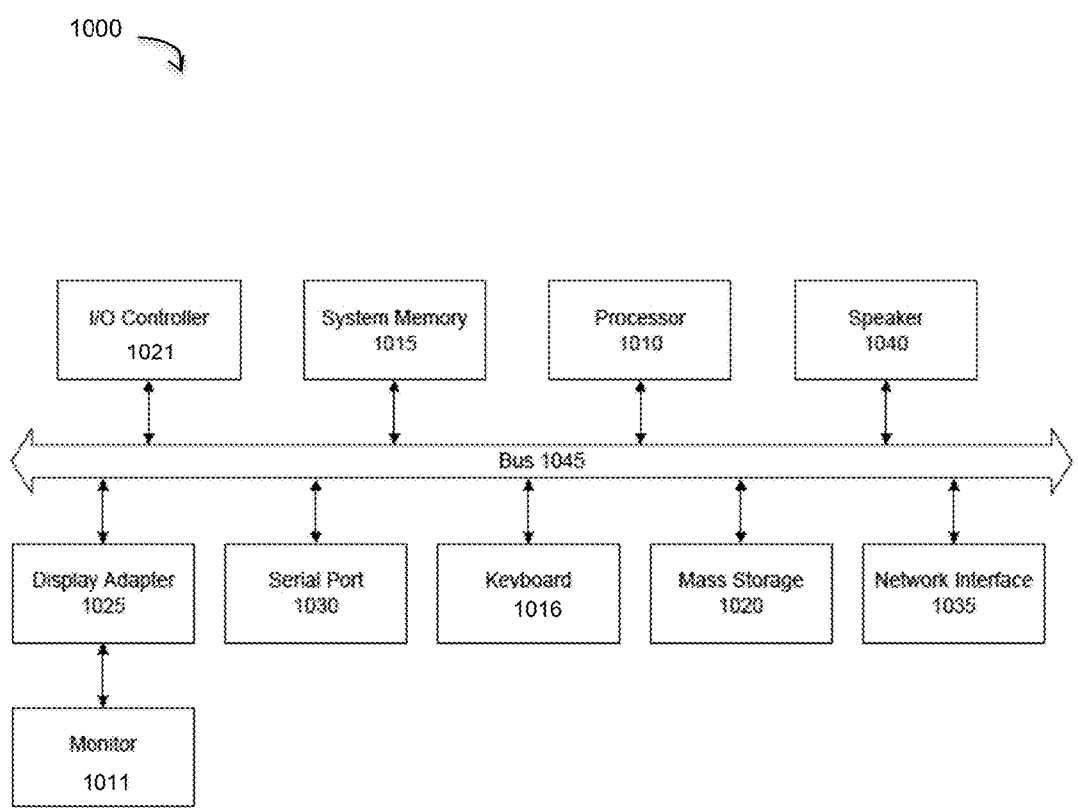
FIG. 5 is a block diagram of a computer system used to execute one or more software components of a system for VXLAN tunneling, under some embodiments.

FIG. 5 is a block diagram of a computer system used to execute one or more software components of a system for VXLAN tunneling, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 5 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of preventing traffic tromboning in a VXLAN network having routers that do not support multiple next hops via the same outgoing port, comprising:
   creating, during an initialization step, a default egress object through an inter-chassis link (ICL) with a next hop defined as virtual link trunking (VLT) peer2;
   setting a MAC address to be the MAC address of the VLT peer2;
   setting a virtual LAN (VLAN) address to be one of a plurality of layer 3 (L3) spanned VLANs; and
   resolving VXLAN tunnels through an ICL link aggregation (LAG) process using the default egress object created on the ICL to route all traffic from a VLT peer1 intended to go through ICL to be terminated on the VLT peer2 and be sent to any respective next hops.

2. The method of claim 1 further comprising:
   performing, in VLT peer1, VXLAN encapsulation of data packets of the traffic;
   setting an outer header of the encapsulation with a destination MAC address of VLT peer2, and an outer destination IP address of a destination virtual terminal endpoint (VTEP); and
   sending the traffic towards a next hop router coupled to the destination VTEP.

3. The method of claim 1 wherein the initialization step comprises bringing VLT peers are up and exchanging system MAC addresses.

4. The method of claim 1 wherein the ICL comprises a link standard providing a dedicated blade for switch ports for end devices in the network by transporting traffic between chassis over a plurality of dedicated high-speed links.

5. The method of claim 1 wherein the routing of all traffic comprises establishing an ICL backup path using certain protection logic of the routers.

6. The method of claim 5 wherein the routers comprise routers manufactured by Broadcom.

7. A method of creating a single egress object to a virtual link trunking (VLT) peer to allow multiple VXLAN tunnels to be reachable through an inter-chassis link (ICL) with optimal paths towards all next hops, comprising:
 sending, from a host, native unicast/broadcast traffic towards a first VLT peer VLT peer1;
 picking, in the first VLT peer, a single next hop router of a plurality of next hop routers reachable through the same ICL port channel of the host; and
 in the event of an uplink failure, modifying a routing protocol of the single next hop router to contain the ICL port and the MAC address of a valid VLT peer coupled to one of the next hop routers; and
 resolving VXLAN tunnels through an ICL link aggregation (LAG) process using the default egress object created on the ICL to route all traffic from the VLT peer1 intended to go through ICL to be terminated on a VLT peer2 and be sent to any respective next hops.

8. The method of claim 7 wherein the modifying of the routing protocol uses certain protection logic of the routers.

9. The method of claim 8 wherein the routers comprise routers manufactured by Broadcom.

10. The method of claim 7 further comprising:
 performing, in the VLT peer1, VXLAN encapsulation of data packets of the traffic;
 setting an outer header of the encapsulation with a destination MAC address of the VLT peer2, and an outer destination IP address of a destination virtual terminal endpoint (VTEP); and
 sending the traffic towards a next hop router coupled to the destination VTEP.

11. The method of claim 10 wherein the modifying creates an alternative/backup ICL backup path, and wherein the VXLAN encapsulated data packets are layer 2 switched at the valid VLT peer towards an alternate router that routes the data packets by looking at the outer destination IP address and rewriting a destination MAC of the outer header as that of the alternate router.

12. The method of claim 11, wherein, upon tromboning of the data packets the VLT peer 2 switches the data packets towards the alternate router.

13. The method of claim 7 wherein the initialization step comprises bringing VLT peers are up and exchanging system MAC addresses, and wherein the ICL comprises a link standard providing a dedicated blade for switch ports for end devices in the network by transporting traffic between chassis over a plurality of dedicated high-speed links.

14. A system comprising a processor-based executable module configured prevent traffic from tromboning in a VXLAN network having routers that do not support multiple next hops via the same outgoing port, comprising:
 a first component creating, during an initialization step, a default egress object through an inter-chassis link (ICL) with a next hop defined as virtual link trunking (VLT) peer2;
 a second component setting a MAC address to be the MAC address of the VLT peer2;
 a third component setting a virtual LAN (VLAN) address to be one of a plurality of layer 3 (L3) spanned VLANs; and
 a resolver resolving VXLAN tunnels through an ICL link aggregation (LAG) process using the default egress object created on the ICL to route all traffic from a VLT peer1 intended to go through ICL to be terminated on the VLT peer2 and be sent to any respective next hops.

15. The system of claim 14 further comprising and encapsulator in VLT peer1, VXLAN encapsulating data packets of the traffic, setting an outer header of the encapsulation with a destination MAC address of VLT peer2, and an outer destination IP address of a destination virtual terminal endpoint (VTEP), and sending the traffic towards a next hop router coupled to the destination VTEP.

16. The system of claim 15 wherein the initialization comprises bringing VLT peers are up and exchanging system MAC addresses, and wherein the ICL comprises a link standard providing a dedicated blade for switch ports for end devices in the network by transporting traffic between chassis over a plurality of dedicated high-speed links.

17. The system of claim 16 wherein the routing of all traffic comprises establishing an ICL backup path using certain protection logic of the routers, and wherein the routers comprise routers manufactured by Broadcom.

* * * * *

UNITED STATES PATENT AND TRADEMARK OFFICE
CERTIFICATE OF CORRECTION

PATENT NO. : 10,382,319 B2
APPLICATION NO. : 15/797312
DATED : August 13, 2019
INVENTOR(S) : Avinash Natarajan et al.

Page 1 of 1

It is certified that error appears in the above-identified patent and that said Letters Patent is hereby corrected as shown below:

On the Title Page

Item (72) Change Inventor Name from "Damodharan Screenivasaga Perumal" to -- Damodharan Sreenivasaga Perumal --

Signed and Sealed this
Thirty-first Day of March, 2020

Andrei Iancu
*Director of the United States Patent and Trademark Office*